US005635853A

United States Patent [19]
Kikinis

[11] Patent Number: 5,635,853
[45] Date of Patent: Jun. 3, 1997

[54] INHERENTLY BALANCED VOLTAGE REGULATION AND CURRENT SUPPLY FOR BUS TERMINATION

[75] Inventor: Dan Kikinis, Saratoga, Calif.

[73] Assignee: Elonex I. P. Holdings, Ltd., London, England

[21] Appl. No.: 556,723

[22] Filed: Nov. 13, 1995

[51] Int. Cl.$^6$ .................................................. H03K 17/16
[52] U.S. Cl. ........................... 326/30; 326/86; 326/101; 327/530
[58] Field of Search .......................... 257/208; 327/530, 327/538, 545; 326/30, 33, 86, 101; 361/683, 720, 748, 772; 395/306

[56] References Cited

U.S. PATENT DOCUMENTS

| | | | |
|---|---|---|---|
| 5,023,488 | 6/1991 | Gunning | 326/86 X |
| 5,111,080 | 5/1992 | Mizukami et al. | 326/30 |
| 5,254,883 | 10/1993 | Horowitz et al. | 326/30 |
| 5,347,177 | 9/1994 | Lipp | 326/30 |
| 5,438,281 | 8/1995 | Takahashi et al. | 326/86 |
| 5,481,209 | 1/1996 | Lim et al. | 326/101 X |
| 5,528,168 | 6/1996 | Kleveland | 375/257 X |

Primary Examiner—David R. Hudspeth
Attorney, Agent, or Firm—Donald R. Boys

[57] ABSTRACT

An inherently balanced electrical supply system for a bus provides improved reliability for bus termination in computer systems. The system is particularly well suited for applications such as personal computer systems. The apparatus includes a single current source that is fed into a feeder line connected to opposite ends of the bus at a point at about the center of the feeder line. The feed path is thus divided into two equal-length segments connected to opposite ends of the bus. Integrated circuit chips connected to the bus, when switched on, draw essentially equal amounts of current through each feeder segment, creating substantially equal voltage drops at both ends of the bus, minimizing the voltage difference. Alternative bus configurations are provided in embodiments of the present invention to suit various board spacing requirements.

14 Claims, 4 Drawing Sheets

INHERENTLY BALANCED VOLTAGE REGULATION AND CURRENT SUPPLY FOR BUS TERMINATION

FIELD OF THE INVENTION

This invention relates generally to current supply and voltage regulation, and pertains more particularly to systems for providing electrical power in a balanced manner to bus structures in computer systems.

BACKGROUND OF THE INVENTION

In computer systems, communication between the central processing unit (CPU) and electronic devices external to the CPU is accomplished by an interconnecting bus. A bus is a parallel set of conductors comprising lines dedicated to specific purposes, such as bits for addresses and data, and for control signals to manage communication. The number of parallel lines in a bus can vary. Some protocols have 16 address bits and 16 data bits, for example, and other protocols may have 32 of each. In some protocols the same set of parallel conductors are multiplexed between data and addresses. Control signals may also vary.

In bus communication, the purpose is to transfer data words from one location to another. The data is expressed on the data lines, and the locations are expressed by addresses on the address lines. The control lines carry signals such as interrupt requests, read/write commands, and the like, for facilitating and directing the communication. The order and speed of communication is controlled by high-speed oscillators (clocks), which pace the addressing and transfer of data.

Early computer clocks ran at, for example, eight megahertz, and, at least theoretically, a specific digital operation may be performed each cycle. At eight megahertz, a cycle is 125 nanoseconds. Computers at the time of this application commonly operate at 66 megahertz. Models entering the market at this time operate at more than 100 megahertz.

In early personal computer designs, the bus, the CPU, and all devices connected to the bus ran at the same speed, which enabled accessories, such as additional memory, to be directly plugged into the system bus. In state-of-the-art computers, CPUs have become significantly faster than some other devices, which requires buses to run at different speeds for efficient utilization of the CPU and operation of peripheral devices.

One solution to difficulties created by increasing speed of CPUs is a bus provided by Intel Corporation called the Peripheral Component Interconnect (PCI) Bus which permits the CPU and memory to run on one bus at one speed while slower input/output devices may operate at a slower speed on another bus. With the CPU isolated from the system bus, PC manufacturers can design motherboards to work with several generations of PCs without having to redesign the motherboard's I/O subsystem for each new processor.

Although the PCI bus is an improvement over previous bus designs, today's ever-evolving CPUs are revealing limitations of the PCI bus structure. For example, greatly increased switching speeds of the signals require that signals may need to be switched at a lower voltage than the 3.3 volt transitions in the PCI design, such as 1.5 volts.

One bus structure that has been developed to work with very fast buses is called the Gunning Transceiver Logic (GTL) bus structure, and will be referred to in descriptions below.

An important criteria for proper operation of bus structures in general is that the bus be terminated properly. By termination is meant the manner in which the lines of the bus are connected to devices that supply electrical current to the bus at the voltage at which the devices on the bus are designed to operate. Such devices are referred to by those with skill in the art by various names, and the variety of terms used can be confusing. In general, however, these devices supply current to lines in a bus structure at a relatively fixed and regulated voltage, and may also supply electrical power to other devices and components than the bus with which the present invention is concerned. For the purposes of this application these electrical supplies will be called voltage-regulated current sources, and sometimes just current sources.

Proper termination becomes especially important in high performance bus structures such as the new GTL structure. Proper and workable termination is to ensure that voltage difference between the ends of the bus be maintained within some specified range such as 50 millivolts, for example. Improper termination leading to excessive drift in bus voltage may cause generation of large currents within the bus structure which may damage delicate integrated circuit chips that are connected, and other vulnerable structures as well, such as the bus lines themselves. Further, improper termination may result in irregular reflection patterns on the bus which may lower the efficiency of smoothing out signal transitions by gunning transceivers in a GTL structure. It is well known in the art that proper voltage termination of busses is of foremost concern.

One technique known to the present inventor to be used to try to maintain relatively constant bus voltage is implementation of multiple regulated current sources to the bus structure. This requires ability for each source to independently compensate in case of voltage drift using cross regulation feedback. Such a system is illustrated in FIG. 1.

FIG. 1 is a simplified block diagram showing termination of a bus structure using multiple sources. Bus 102, shown as a single line in the figure, represents a multi-conductor bus, which has pull-up resistors 104 and 106 connected at each end of the bus. There are actually separate resistors for separate lines in the bus, but the single line analogy of the figure avoids complexity and provides a clearer indication of the function of the various elements.

Two integrated circuit chips 103 are shown connected to bus 102. These chips represent any of several devices that might be connected to the bus, such as a CPU and the like. Voltage regulated sources 108 and 110 are connected to the bus via pull-up resistors 106 and 108, to maintain voltage magnitude and stability at both ends of bus 102. Feedback lines 112 and 113 connecting sources 108 and 110 provide feedback information between the sources so the system can compensate for drift of either source. In this way, the voltage difference between the two ends of the bus is meant to be maintained within in a specified range.

In this relatively complicated arrangement, using multiple voltage regulated sources at different points in a bus structure, accurate and uniform voltage regulation throughout the bus is difficult to achieve because the feedback signals have discernible lag times. Oscillations are known to result from the delayed feedback, and such oscillations may actually be self reinforcing.

Another problem with the multiple source solution is that all the extra components increases the cost of the overall structure. What is needed is a simplified, reliable, and relatively low-cost voltage termination apparatus and method for high performance bus structures.

SUMMARY OF THE INVENTION

To achieve the foregoing and other objectives of the invention and in accordance with purpose of the present invention, an inherently balanced system for termination of bus structures in computer systems is disclosed herein. In a preferred embodiment of the present invention a single current source having an output is fed into the center of a feeder line resulting in two equal length segments. A bus is connected to each end of the feeder line and a plurality of integrated circuit components are, or may be, connected thereto. When any device connected to the bus switches on, equal amounts of current are drawn through both segments creating equivalent voltage drops across both ends of the bus thereby creating inherent voltage stability. Alternative bus configurations are provided following the principles of the invention, and work equally well providing that current paths of the feeder line to both ends of the bus are kept equal. Pull-up resistors are connected to the bus to bring the bus voltage up to a specified value. Further, coupling capacitors are connected to the bus to compensate for short term current effects for components connected closer to one end of the bus.

In a method aspect of the present invention, an output from a single current source is connected to a feeder line. The output is connected to the topological center point of the feeder line such that two equal length segments are created. Pull-up resistors are connected to each end of the bus to bring the bus up to a specified voltage. Coupling capacitors are then connected to the bus to compensate for short term current imbalances for integrated circuit components connected closer to one end of the bus. The present invention provides a relatively simple and efficient method of inherently balancing the current entering both ends of the bus from a single source. This significantly improves voltage stability and maintains termination of the bus without the use of multiple regulators and feedback.

These and other advantages of the present invention will become apparent upon reading the following detailed descriptions and studying the various figures of the drawings.

BRIEF DESCRIPTION OF THE DRAWINGS

The invention, together with further objects and advantages thereof, may best be understood by reference to the following description taken in conjunction with the accompanying drawings in which.

DETAILED DESCRIPTION OF THE PREFERRED EMBODIMENTS

Figure 1:
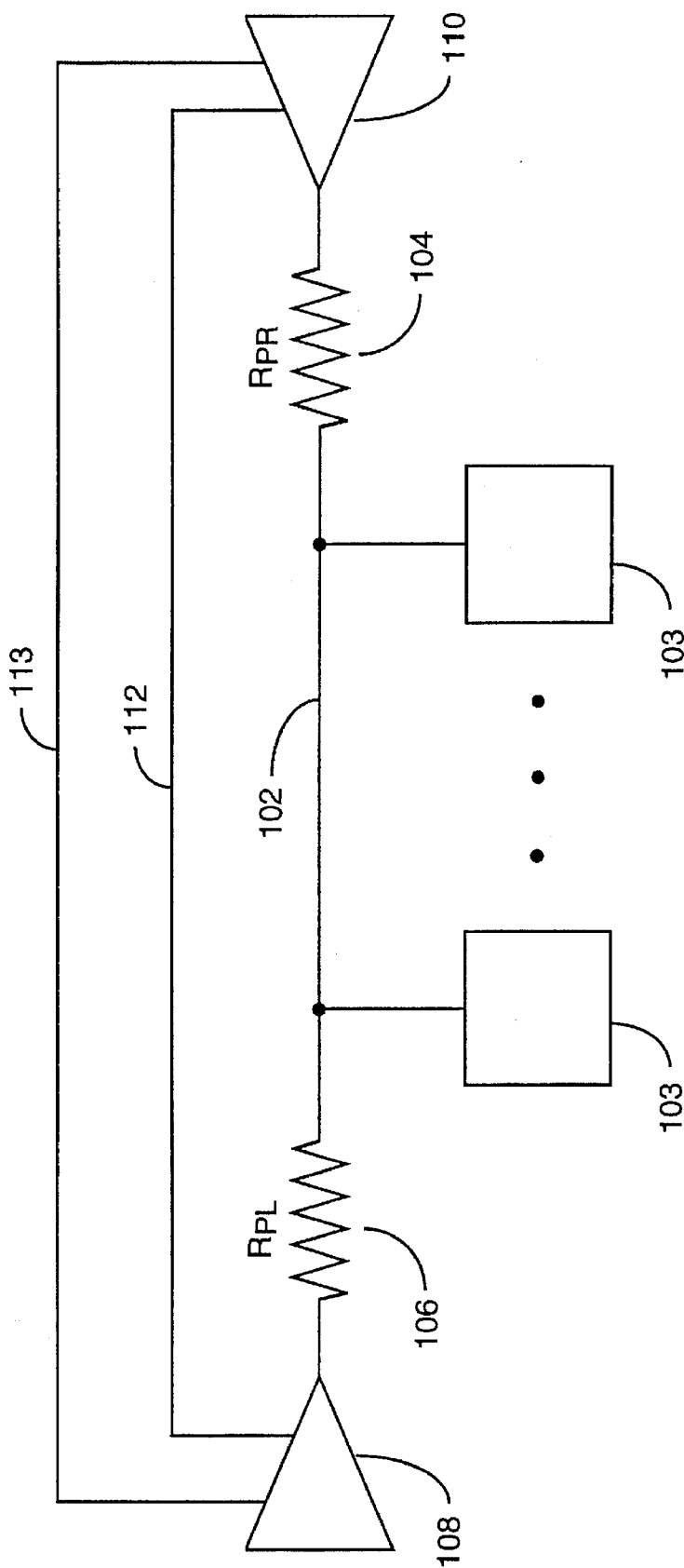
FIG. 1 is a simplified block diagram of a typical terminated bus structure using multiple regulators with cross feedback.

A discussion of FIG. 1 in the Background section above is directed toward voltage termination of a bus structure using multiple electrical sources. A simplified termination method and apparatus for bus structures in computer systems is described below in accordance with various embodiments of the present invention.

As in FIG. 1 described above, buses are depicted in all of the figures described below as single lines, but it should still be understood that the single line represents several parallel conductors.

Figure 2:
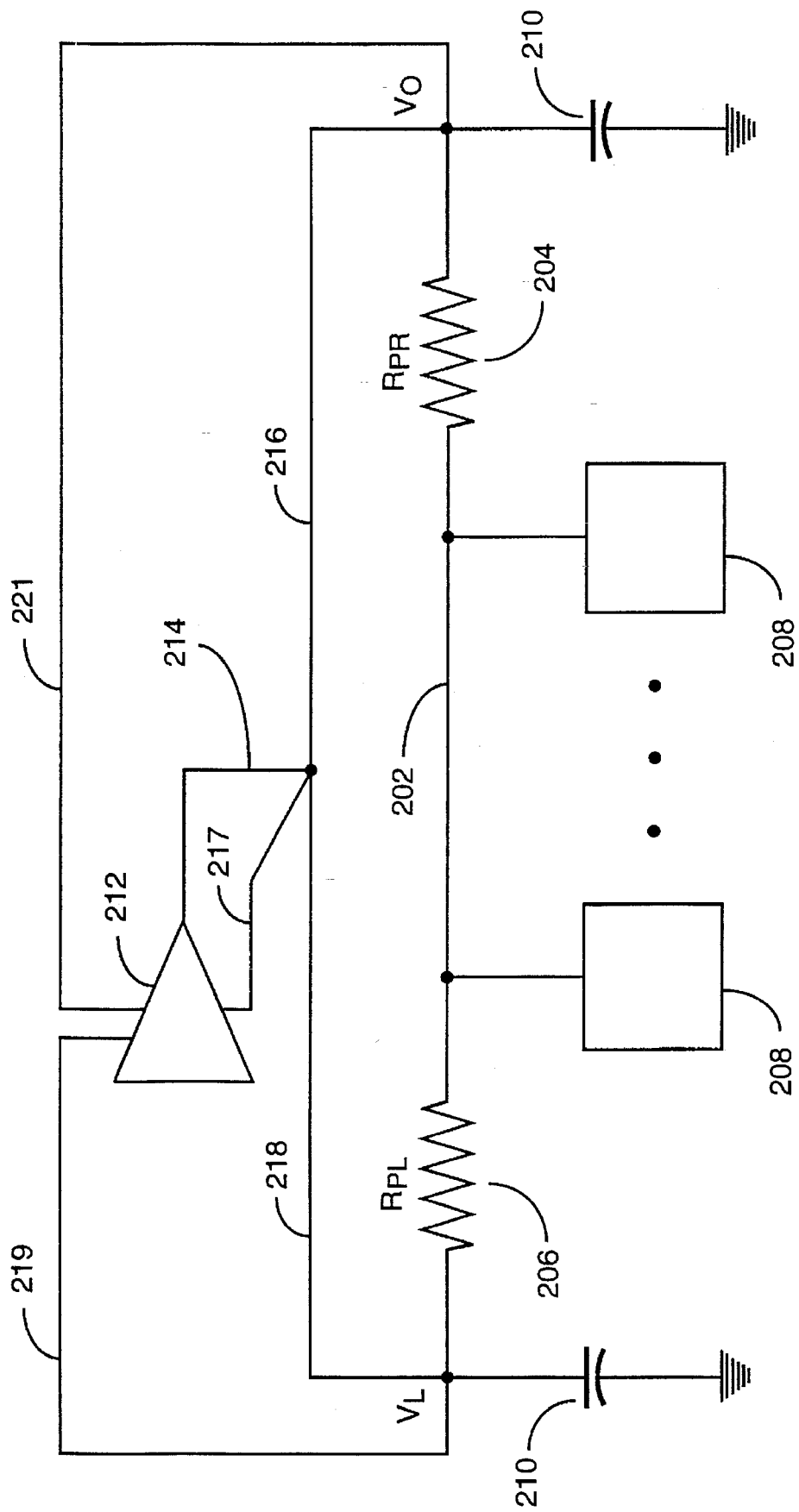
FIG. 2 a simplified block diagram of a first embodiment of the present invention for terminating a bus structure.

Referring now to FIG. 2, bus 202 is connected to a pull-up resistor $R_{PR}$ 204 and a pull-up resistor $R_{PL}$ 206 at the right and left ends respectively of bus 202. Although the number of pull-up resistors may be somewhat arbitrary, two are used here for illustration purposes in the following description.

As was the case in FIG. 1, pull-up resistors are included to bring the voltage levels on lines of the bus up to a specified value, such as the 1.5 volts used for structures with high switching speed. The pull-up resistors are low-ohm resistors used to bring up a line to a particular voltage. Devices 208, representing various devices that might be connected to bus 202, are represented as connected at different points to bus 202.

Decoupling capacitors 210 are provided for decoupling bus 202 to protect the components connected to the bus from voltage or current spikes and to compensate for short term current imbalances caused by switching components that may be closer to one end of the bus than to the other end. When a device on the bus switches on, more current will initially be drawn from the closer end of the bus for a very short time, so the decoupling capacitor 210 closer to the device supplies current in that short time span until an equilibrium state is reached. As known to those skilled in the art, the capacitance must be chosen such that the charge/discharge time (time constant) is sufficient to supply the short term current requirements. The actual values for resistors, capacitors, and the like, may vary depending on application in practicing the present invention, but the required values may be calculated by techniques well known to those skilled in the art without undue experimentation.

In accordance with the present invention, a source 212 provides current through output line(s) 214 into feeder lines 216 and 218. Feeder lines 216 and 218 are substantially equal in length and will have some inherent resistance which is easily measured or calculated in different applications of the invention.

Transceiver units of IC components 208 typically constitute open collectors of MOS transistors, thus when a component switches on, current is drawn from single source 212 in a manner that symmetrical current flow is realized through each feeder line 216 and 218. This results in nearly equal voltage drop at the ends of the bus (i.e. $V_L=V_R$), causing the voltage difference to be substantially zero. This state remains stable because any change in current draw affects each feeder line substantially equally, thereby inherently maintaining the same voltage at both ends of the bus.

In some embodiments of the invention source 212 may be a regulated source with feedback lines for sensing voltage at different points. Line 217 is an optional line for sensing voltage at the intersection of equal-length feed lines 216 and 218. Lines 219 and 221 are optional lines for sensing voltage at the ends of bus 202. These options may also be used in the embodiments of FIGS. 3 and 4 described below, although they are not shown in FIGS. 3 and 4.

Proper bus termination is extremely important in computer applications such as these described since relatively large amounts of current can be generated if there are sizable differences in bus voltage. Also, improper termination yields other effects such as undesirable reflection characteristics on the bus. In GTL technology, for example, reflection characteristics directly affect operation since signal transitions become distorted by undue reflections thereby reducing the Gunning transceivers effectiveness in smoothing out the transitions. Reflection characteristics may also be affected by the proximity of the chips to each other on the bus. Thus a minimum distance between chips must be maintained to preserve reflection integrity.

The structure shown in FIG. 2, comprising, as it does, a bus, electrical supply for the bus, and components connected to the bus, can be considered as a motherboard for a computer system. The same is true for FIGS. 3 and 4 described below.

Figure 3:
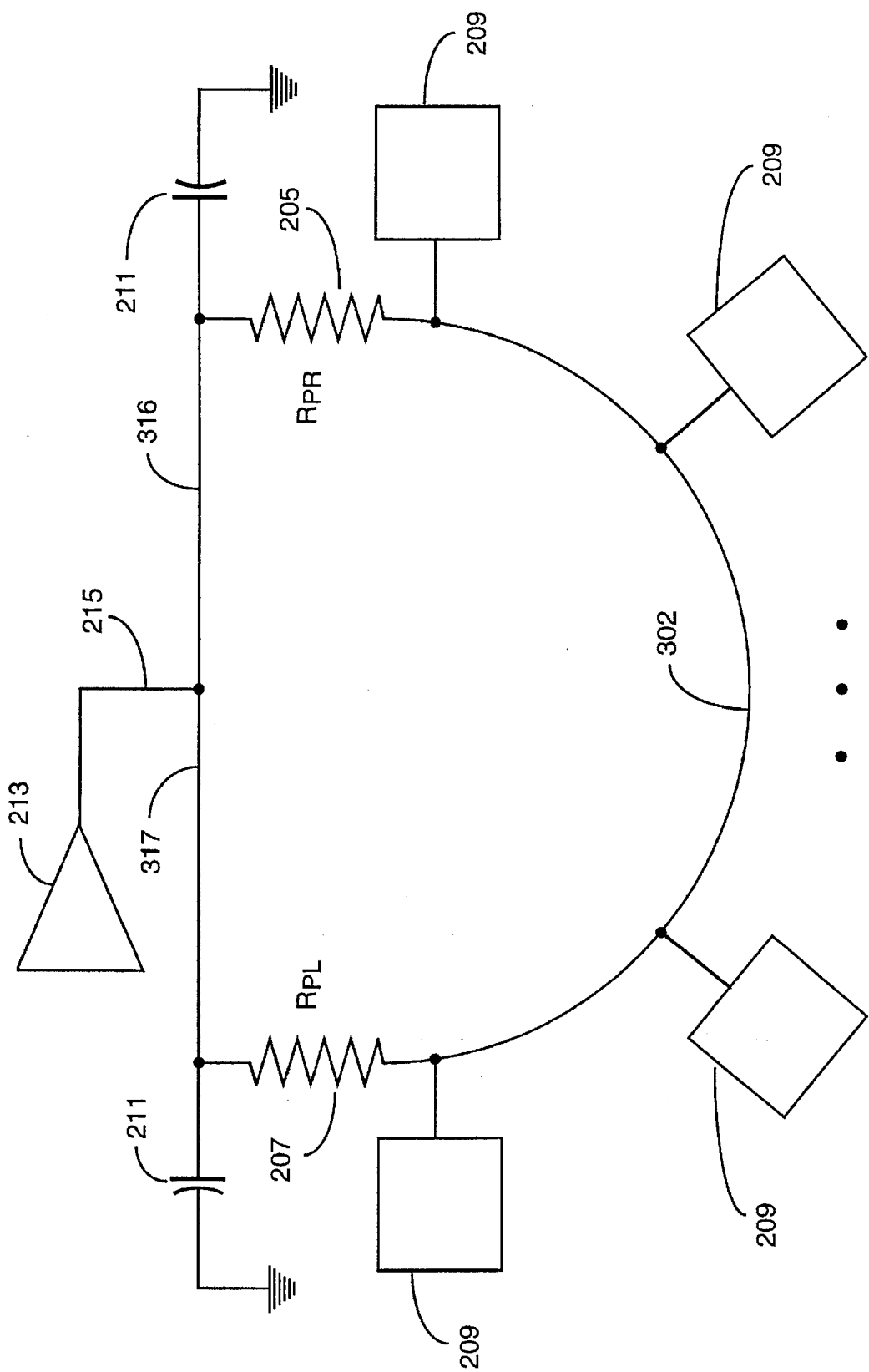
FIG. 3 a simplified block diagram of a second embodiment of the present invention for terminating a bus structure.

FIG. 3 is a block diagram of an alternative embodiment of the present invention showing a horse-shoe shaped bus 302 and a straight feeder line comprising equal-length segments 316 and 317. This arrangement permits an alternative layout of chips suitable for specific spacing requirements of various circuit boards. In the embodiment of FIG. 3 a number of devices 209 are connected to bus 302 which is extends in a semicircular fashion. As in the embodiment of FIG. 3, pull-up resistors 205 and 207 are connected to the ends of bus 302 and decoupling capacitors 211 are added for similar reasons as described for the capacitors of FIG. 2. A source 213 having a single output 215 is fed into feeder lines 316 and 317 of substantially equal length, thereby producing equal current flow in segments 316 and 317. A stable, near-zero voltage difference is inherently maintained at the ends of the bus without the need for complicated circuitry or cross regulation feedback.

Figure 4:
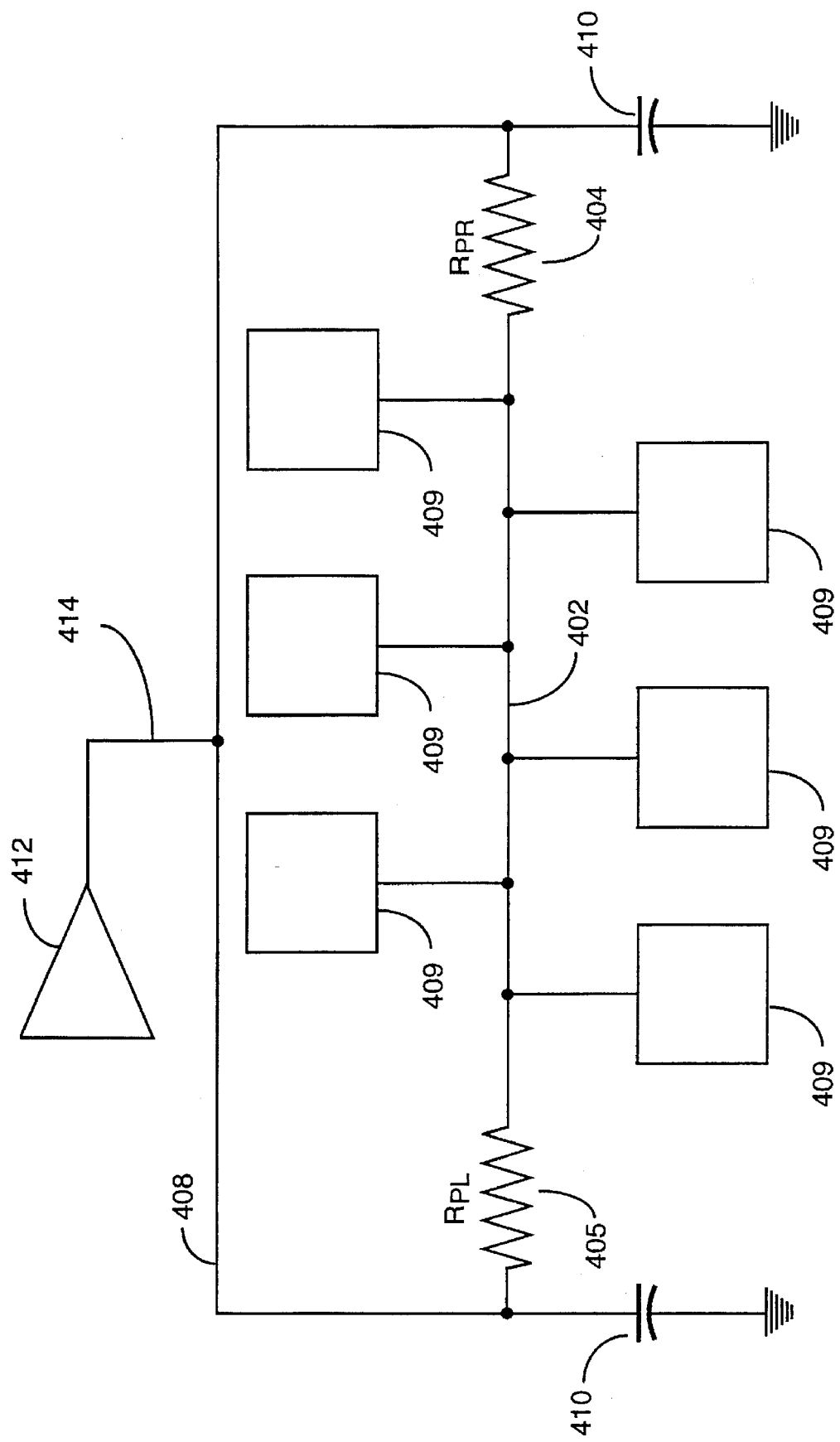
FIG. 4 a simplified block diagram of a third embodiment of the present invention for terminating a bus structure.

FIG. 4 depicts another alternative embodiment in accordance with the present invention showing an alternative arrangement for devices 409 connecting to a straight bus 402. In this arrangement, devices 409 are conveniently positioned on both sides of bus 402. Similar to the previous embodiments, both ends of bus 402 are connected to both right and left pull-up resistors 404 and 405 respectively. Source 412 having an output line 414 is connected to the center of a feeder line forming equal-length segments 406 and 408. The ends of these segments are connected to the bus 402 via pull-up resistors 404 and 405. Further connected to both sides of the bus are decoupling capacitors 410. Current compensating decoupling capacitors 410 are included for short term balancing.

The present invention provides a relatively simple and efficient method of inherently balancing the current entering both ends of a bus from a single source. This significantly improves voltage stability and maintains termination of the bus without using multiple regulators and cross feedback. Further, the method provides flexibility in accommodating various board spacing requirements in permitting various device arrangements to be connected to the bus.

Although three embodiments of the present invention have been described in detail, it should be understood that the present invention may be embodied in many other specific forms without departing from the spirit or scope of the invention. In particular, the method is described in the present invention as being applied to printed circuit boards, but the invention may also be applicable in other embodiments to such as buses implemented on ICs. Therefore the examples provided above are to be considered as illustrative and not restrictive, and the invention is not to be limited to the details given herein, but may be modified within the scope of the appended claims.

What is claimed is:

1. An electrical supply system for a computer bus comprising:

a current source having an output;

first and a second feeder lines of substantially equal length each having a first end connected to the output of the current source, and a second end; and a bus adapted for interconnecting a plurality of electronic devices and having a first end and a second end;

wherein the first end of the bus is connected to the second end of the first feeder line, and the second end of the bus is connected to the second end of the second feeder line.

2. An electrical supply system for a computer bus as recited in claim 1 further comprising pull-up resistors between the first and second ends of the bus and the second ends of the first and second feeder lines.

3. An electrical supply system for a computer bus as recited in claim 1 wherein decoupling capacitors are connected to said bus to provide short-term current compensation for components connected closer to one end of the bus than to the other end of the bus.

4. An electrical supply system for a computer bus as recited in claim 1 wherein said bus is linear in configuration.

5. An electrical supply system for a computer bus as recited in claim 1 wherein said bus is contoured.

6. A motherboard for use in a computer system, the motherboard comprising:

a multi-conductor parallel bus implemented on said printed circuit board, said bus having a first end and a second end;

a plurality of electronic devices connected to said multi-conductor bus; and an electrical supply system for said multi-conductor parallel bus;

wherein the electrical supply system comprises a current source having an output, a first feeder line connected to the output of the current source and to the first end of the bus, and a second feeder line substantially equal in length to the first feeder line and connected to the output of the current source and to the second end of the bus.

7. A motherboard as recited in claim 6 wherein said electrical supply system includes pull-up resistors to bring up said bus line to a specified voltage.

8. A motherboard as recited in claim 6 wherein coupling capacitors are connected to said bus to provide short term current compensation for components connected closer to one end of the bus.

9. A computer system comprising:

a display monitor;

an input apparatus;

a motherboard including a bus having a first and a second end, a CPU and a plurality of devices coupled to the bus; and an electrical supply system comprising a current source having an output, a first feeder line connected to the output of the current source and to the first end of the bus, and a second feeder line substantially equal in length to the first feeder line and connected to the output of the current source and to the second end of the bus.

10. A computer system as recited in claim 9 wherein said electrical supply system further comprises pull-up resistors to bring up said bus line to a specified voltage.

11. A computer system as recited in claim 9 wherein coupling capacitors are connected to said bus to provide short term current compensation for components connected closer to one end of the bus than to the other end.

12. A method for terminating a bus structure comprising steps of:

(a) connecting opposite ends of the bus structure together by a single feeder line; and (b) connecting a single current source to the single feeder line at a point substantially equidistant from the ends of the bus structure.

13. The method of claim 12 including a step for providing pull-up resistors at each end of the bus between the bus and the ends of the feeder line.

14. The method of claim 12 including a step for providing decoupling capacitors at each end of the bus to compensate for short term current effects.

* * * * *